Nov. 15, 1966     W. L. WERNER     3,284,972
PORTABLE TOWER
Filed May 15, 1964     4 Sheets-Sheet 1
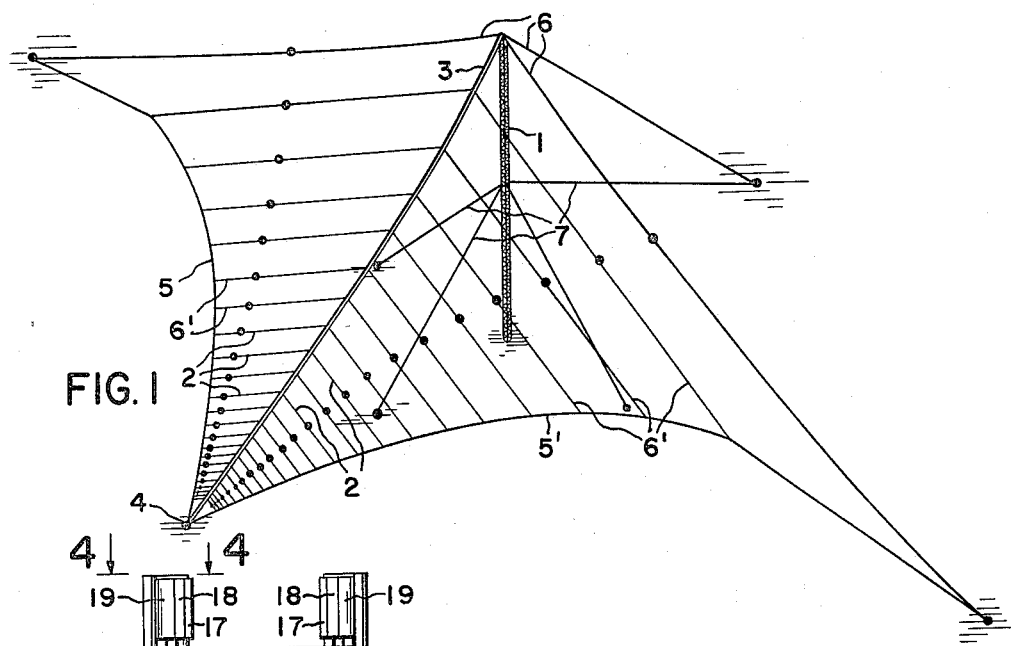
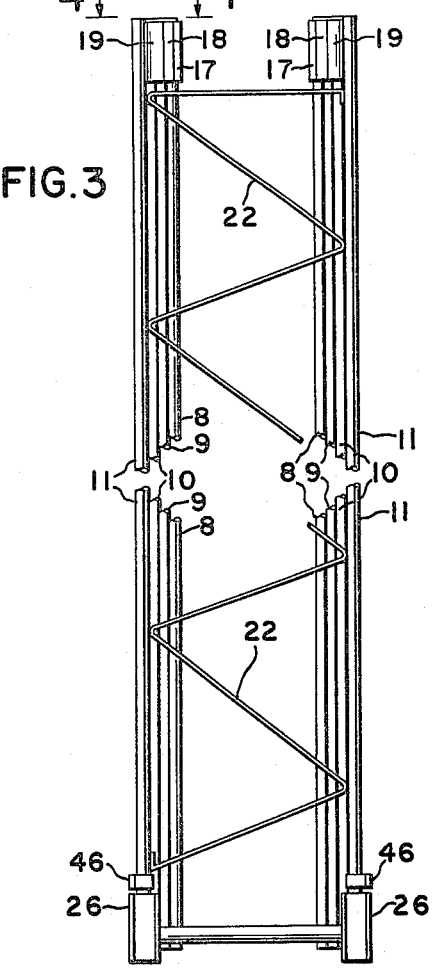
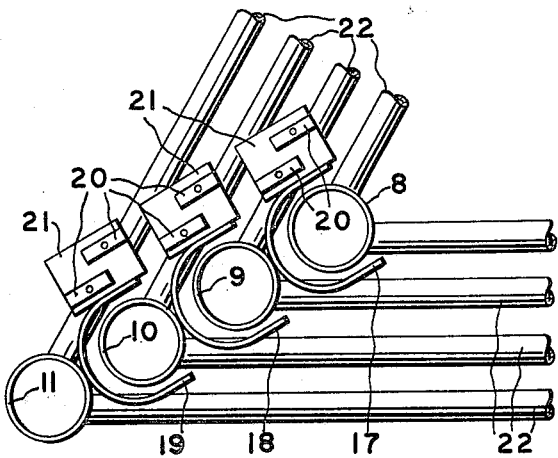
INVENTOR.
WILLIAM L. WERNER
BY
Paul B. Hunter
ATTORNEY

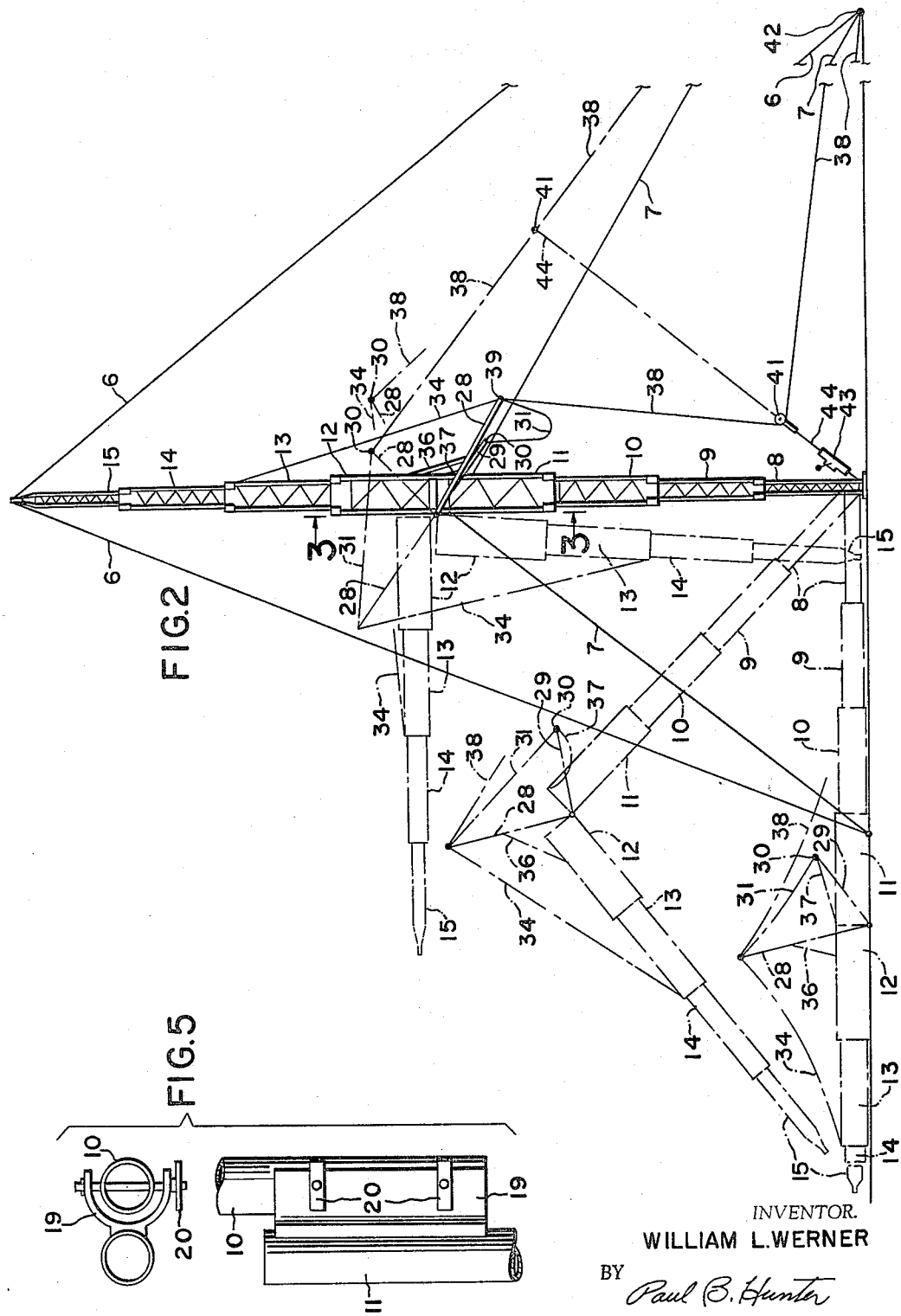

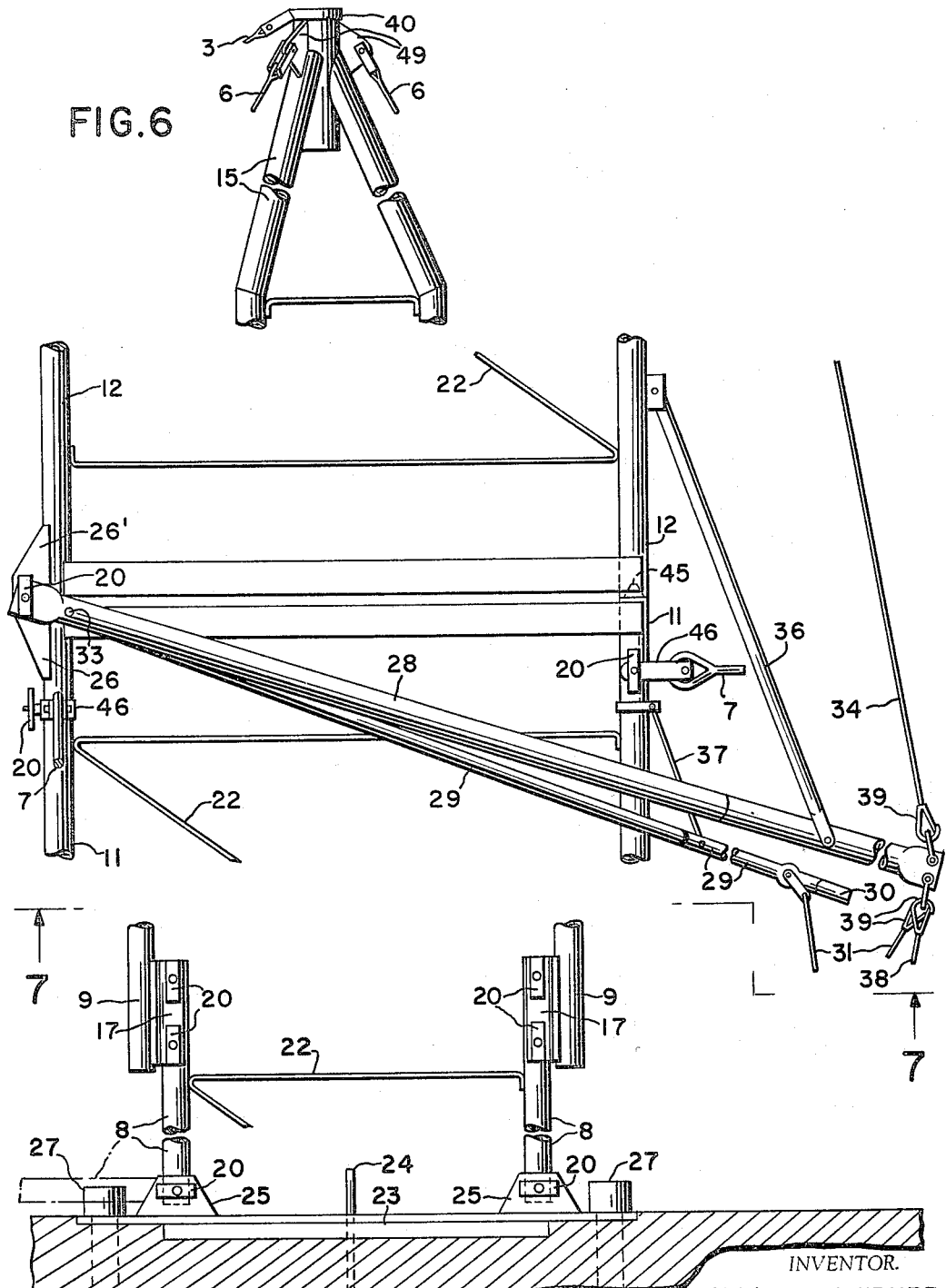

Nov. 15, 1966  W. L. WERNER  3,284,972
PORTABLE TOWER
Filed May 15, 1964  4 Sheets-Sheet 4
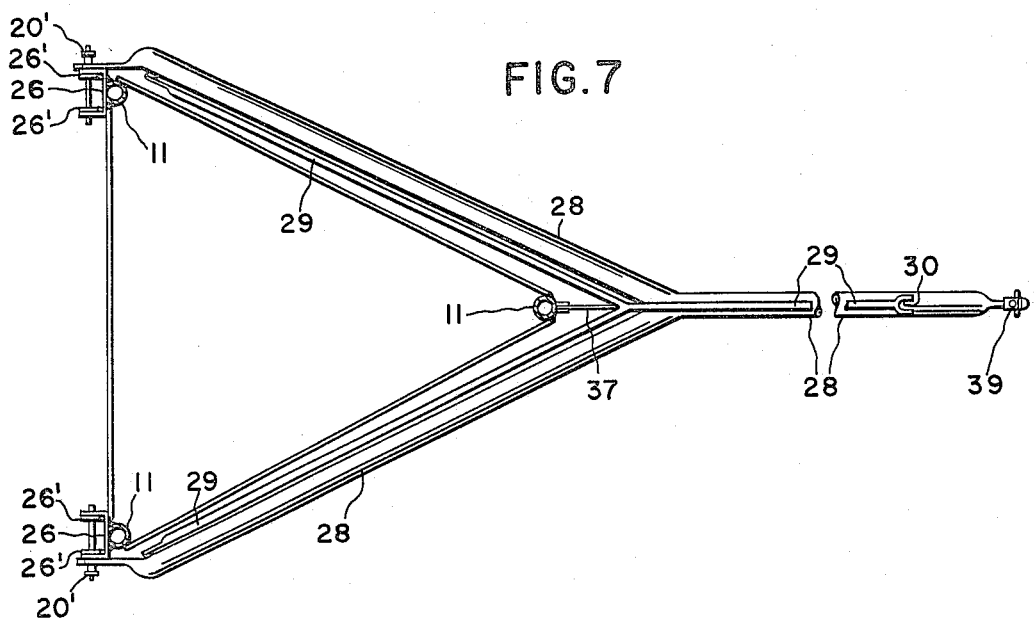
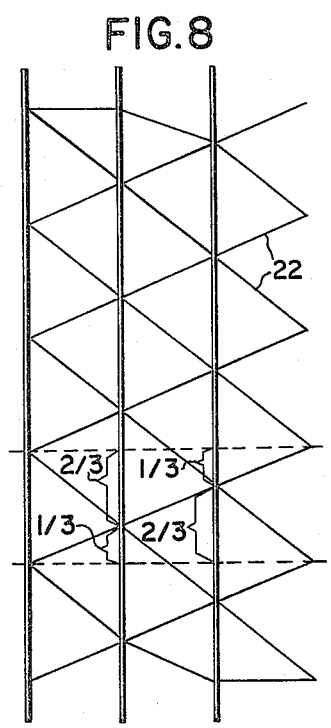 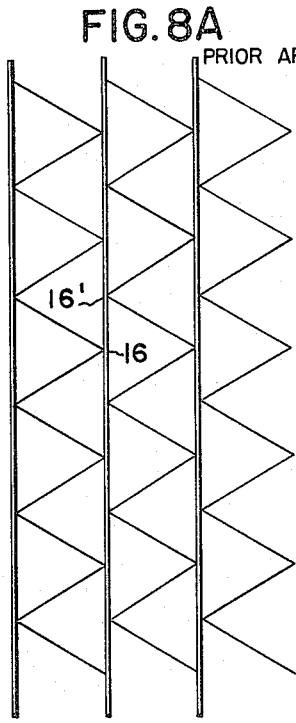 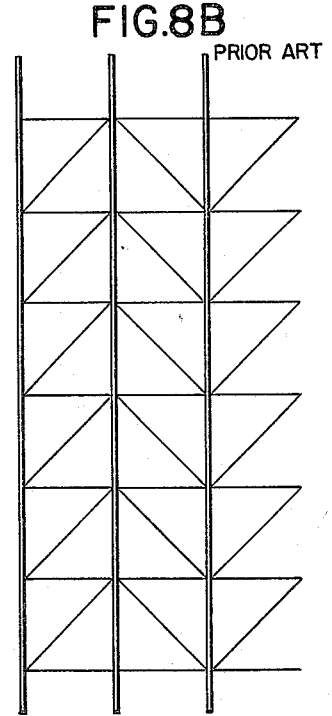
INVENTOR.
WILLIAM L. WERNER
BY
Paul B. Hunter
ATTORNEY United States Patent Office 3,284,972
Patented Nov. 15, 1966

3,284,972
PORTABLE TOWER
William L. Werner, Sunnyvale, Calif., assignor to Granger Associates, Palo Alto, Calif., a corporation of California
Filed May 15, 1964, Ser. No. 367,850
8 Claims. (Cl. 52—118)

This invention relates generally to antenna towers, and the invention has reference, more particularly, to a novel, easily portable and easily installed high frequency multiple section antenna tower.

Heretofore, towers have been erected in sections and guy lines used at certain intervals along the tower height to brace the tower from the ground. The erection of such towers as heretofore constructed has always been a time-consuming and costly operation, usually requiring scaffold structures and hoisting equipment requiring the crew to work at times well above the ground with the attendant danger of accidents.

The pricipal object of the present invention is to provide a novel, easily and quickly erected antenna tower comprising upper and lower tower halves, each tower half consisting of a number of telescoping tower sections, whereby the sections comprising each tower half can be shipped, with its sections, completely telescoped one within the other, making an easily portable structure, the tower sections being preferably made of light-weight material such as aluminum, and fabricated so as to have a maximum strength while employing a minimum of material.

A feature of the novel tower of the present invention lies in the fact that it can be erected by three to five men without getting off the ground in less than one hour, and without the use of towers or other expensive equipment, the said erected tower possessing unusually high reliability and resistance to wind loading with a minimum of guy lines and a structural load capacity approximating that of an expensive fixed tower.

Another feature of the present invention is to provide a novel tower of the above character which employs section joints that are made rigid by the use of push-button operated quick release lock-pins applied at ground level where the assembly can be readily checked before elevating the tower.

Still another feature of the invention is to provide a simplified, rugged tower employing a minimum of guy lines, a seventy-four foot, eight section tower employing but two levels of guy lines, for example, one set at midsection of the tower and another at the top of the tower, whereas heretofore, most sectional towers required guys at each section joint because of the lack of sufficient rigidity at joints and lack of structural rigidity or moment of inertia of the sectional cross-sections used.

Still another feature of the novel tower of the present invention is the use of tower sections of triangular cross-section, providing a three-legged structure and a three-point support on the tower base plate, together with novel, extremely rigid leg cross-bracing and a double-hinge connection between the lower and upper tower halves, which a small crew of men can use to jackknife the tower halves up, utilizing the top half of the tower as a gin or prop to erect the lower tower half, the upper half of the tower being erected by use of a novel yoke and toggle structure and erection line.

These and other features and advantages of the present invention will be more apparent after a perusal of the following specification taken in connection with the accompanying drawings wherein:

FIG. 1 is a perspective view illustrating a novel tower of this invention with a log-periodic, horizontally polarized, high-frequency antenna supported therefrom by the use of catenaries;

FIG. 2 is a view in side elevation of the erected tower showing certain positions of the tower during erection in dot-dash lines;

FIG. 3 is a side view of a package comprising the telescoped lower half sections of the tower;

FIG. 4 is an enlarged fragmentary view looking in the direction of the arrows on line 4—4 of FIG. 3;

FIG. 5 is a composite fragmentary view showing the manner of rigidly connecting the tower sections;

FIG. 6 is an enlarged view of the tower proper with parts broken away and showing details of construction;

FIG. 7 is a sectional view taken along line 7—7 of FIG. 6;

FIG. 8 is a diagrammatic view of a tower section unfolded to illustrate the pattern of cross-bracing used, and FIGS. 8A and 8B illustrate schematically ordinary types of cross-bracing in unfolded or developed form;

Similar characters of reference are used in the above figures to designate corresponding parts.

In FIG. 1, the novel portable tower is illustrated in schematic form, erected and shown supporting a high-frequency log-periodic horizontally polarized antenna comprising a series of porgressively spaced and centrally fed dipoles 2 supported by a catenary feed line cable 3 leading from the top of tower 1 to the apex 4 attached to the ground, the antenna being broad band and radiating in the direction of the apex 4 from the tower. Side catenaries 5 and 5' are tied by ropes 6' to the lower ends of the dipoles 2. Two sets of guy lines 6 and 7 are connected respectively to the top of the tower and to the central height of the tower to maintain the same in fixed vertical position in use. The tower illustrated is seventy-five feet in height although taller or shorter towers may be built incorporating the novel features of this invention.

In FIG. 2, the tower is shown built up of a lower half consisting of telescopic sections 8, 9, 10 and 11 progressively increasing in width from the ground up, and an upper half consisting of telescopic section 12, 13, 14 and 15 progressively decreasing in width from the midpoint of the tower upwardly. Thus, the width and hence the resistance of the tower sections to bending increases progressively from the bottom and top of the tower towards its central portion where the greatest bending stresses occur in use.

The four lower half tower sections 8, 9, 10 and 11 are constructed so that they can be nested or telescoped together as shown in FIG. 3 when shipping the same, thus making a very compact package. These sections are of triangular shape and each consists of three tubes or rails arranged as a tripod cross-braced by a novel, light-weight cross-bracing 22. Heretofore, triangular truss towers have been generally cross-braced by the Warren, or "W" type bracing or by the standard "Z" bracing such as shown in developed or unfolded form in FIGS. 8A and 8B respectively. While the "W" type bracing of FIG. 8A requires about 10% less length of cross-bracing for an equal face width and bay height than the standard "Z" bracing, a disadvantage of this "W" type is that the internal volume of the structure is not enclosed by structural members forming imaginary tetrahedrons; i.e., the simplest solid structures bounded by four triangles or six edge members. The tetrahedral design improves the structural rigidity and especially torsional rigidity.

A further disadvantage of the "W" bracing is that the vertical rails of a tower using the same are never supported laterally in two planes at one point as at points 16 and 16' in FIG. 8A On the other hand the "Z" bracing not only requires considerably more metal and hence is more expensive than the "W" bracing, but the diagonal of the "Z" bracing is relatively long, and, since column load capability varies inversely with the square of the length of the column, a member of lower section modulus and cross-sectional areas can be used when employing "W" bracing for equal end loading capability. Critical column load for slender columns is given by Euler's formula, i.e., $$P_c = \frac{\pi^2 E I}{L^2}$$

where:
$P_c$=critical load in lbs.
$I$=moment of inertia
$E$=modulus of elasticity
$L$=length of column The present tower uses a novel type of cross-bracing 22 for a triangular truss tower as illustrated in FIG. 8 in which the advantages of both the "W" and "Z" bracing is obtained without their disadvantages. The bracing of FIG. 7 is obtained by joining the two tubes or rails of a tower section face with bracing that is affixed to the rails in a single bay at one-third and two-thirds height points of the bay instead of the one-half bay point, as in the "W" bracing and the top and bottom of the bay as in the "Z" bracing. This novel bracing uses considerably less material length than the "Z" bracing, and the brace member length is also considerably less than the diagonal brace of the "Z" type. In addition, the bracing 22 used in the tower of this invention forms imaginary tetrahedrals of all the enclosed volume of the tower and supports the tower rails in two planes at each point of support as with the "Z" bracing, thus forming an exceedingly rugged structure for the weight of metal used.

As particularly shown in FIG. 4, the upper ends of the tubular rails of lower half tower sections 9, 10 and 11 are formed with inwardly projecting lugs or nesting brackets 17, 18 and 19 of U-shaped cross-section for receiving the rail and portions of the next inner section. Thus, nesting bracket 19 of uppermost lower half tower section 11 receives the rails of section 10. In use, the sections are pulled outwardly from their nested positions shown in FIG. 3 and the sections clamped together while lying on the ground through the use of push-button operated quick release lock-pins 20 carried by plates 21 fixed to the nesting brackets 17, 18 and 19, when shipped.

Thus, as shown in detail in FIG. 5, each of the nesting brackets has two apertures which when aligned with similar apertures in the end portion of the cooperating section rails, will receive a quick release lock-pin 20, care being taken to push the button in the middle of the handle of the lock-pin, push the pin all the way through the holes in the nesting bracket and enclosed section rail such as 10, and then release the button, locking the pin 20 in place, and retaining the sections in rigid extended alignment.

While the lower half tower is shown as composed of four sections, actually a lesser or greater number of sections may be used. These sections are preferably made up of aluminum tubing or aluminum alloy tubing so as to be light in weight, and yet very strong, whereby the sections can be nested and carried from place to place when desired, the quick release pins 20 enabling the rapid assembly of the tower sections when erected, as well as rapid disconnecting and nesting when moving the tower. The four upper tower sections 12, 13, 14, and 15 are likewise adapted to be shipped nested or telescoped and can readily be extended on the site of erection.

As particularly illustrated in FIG. 6, the tower is provided with a base plate 23, preferably of triangular shape. This plate 23 can be placed over a tower locating marking rod 24 when initially set up, and is provided with triangularly disposed hinge brackets 25. To assemble the tower, holes provided in the lower ends of two of the tower legs of the small section 8 are aligned with corresponding holes in two of the hinge brackets 25 and hingedly connected by pins 20, as shown in dot-dash lines of FIG. 6, while the extended and locked together tower sections 8, 9, 10 and 11 lie upon the ground and are turned about marking rod 24 while turning plate 23 until the extended lower tower half points in the desired direction of antenna radiation of the tower, i.e., in the direction of apex 4. The base plate 23 may now be anchored by driving in three anchor stakes 27.

Two of the legs of large section 11 corresponding to the two legs of section 8 hinged to brackets 25 of base plate 23 are provided at their upper ends with hinge brackets 26 adapted to receive corresponding mating brackets 26' provided on the lower end portions of two of the legs of upper large tower section 12. The upper tower half may be laid on the ground in line with its lower tower half, then extended and its sections locked together with lock pins 20 as in the case of the lower tower half sections.

The cooperating hinge brackets 26 and 26' are adapted to mate and be connected by quick release lock pins 20'. Before inserting the pins 20', however, an A-frame type of erection boom 28 is positioned so that its legs straddle section 11, the ends of the legs having holes to be aligned with the holes in brackets 26 and 26', as shown in FIGS. 6 and 7, wherever the pins 20' are inserted. This boom 28 has a shorter auxiliary boom 29 also of A-frame design connected thereto as by pivots 33, and the outer end of the auxiliary boom 29 is provided with a V-groove 30 for supporting an erection cable 38 as will further appear. The outer end portion of this auxiliary boom 29 is connected by cable 31 to the top or outer end of the erection boom 28 and this outer end of boom 28 is also connected by cable 34 to the top of upper half tower section 13. A rigid boom stop or rod 36 is connected to erection boom 28 and to upper half section 12 to position the erection boom with respect to the upper tower half. A short cable 37 is adapted to connect the middle of the auxiliary boom to the top rail of the lower half tower section 11 to limit the movement of the auxiliary boom.

Assuming the tower is lying on the ground, as shown in dot-dash lines in FIG. 2, and that it is now desired to raise the same, the erection cable 38 is snapped by a snap fastener 39 to the end of the main erection boom 28, and the cable is laid along the lower tower half so as to fall into the V-groove 30 of the auxiliary boom as the tower is raised. Bracket 46 carrying guy lines 7 (see FIG. 6) are connected by quick release pins 20 to the upper end portions of the rails of lower half section 11. Also, guy lines 6 are connected by quick release pins 20 to the upper bracket 49 at the peak of the upper tower section 15. The catenary feed line 3 supporting the antenna dipoles 2 is attached to a swivel pin 40 inserted into the upper bracket 49. Since the tower is of strong, light-weight construction, it can be raised easily by a few men. Initially, the tower is lifted just below the hinges 26 until it is high overhead, and then, using the upper half tower as a pike pole, the lower half tower is pushed to an upright position as shown in dot-dash lines in FIG. 2 in which position the upper tower half lies close to the vertical lower tower half and the erection cable 38 passes from the V-groove 30 in the end of auxiliary boom 29 under a pulley 41 carried by line 44 to a rear stake 42.

A winch 43 is connected to the base plate 23 and to the rope or line 44 and by tightening winch 43 the erection cable is tightened, and the upper tower half raised initially by auxiliary boom 29 acting as a lever and then by the erection boom 28 acting as a lever about the points 26-26'. Before raising the upper tower half, however, the third rail of tower section 8 is connected by a quick release pin 20 to the remaining base hinge bracket 25. The guy lines 6 and 7 can be used to keep the upper and lower tower halves in proper alignment while raising the tower and also position the tower so that it is vertical. As the tower reaches vertical position, the third rail of upper tower section 11 will align with and rest upon centering plug 45 provided in the third leg of lower tower section 11. Tightening the guy lines 6 and 7 and the antenna catenaries 3, 5 and 5' completes the tower and antenna erection, the entire erecting operation usually taking less than a couple of hours without anyone getting off the ground. Similarly, by reversing the above steps, the antenna can be taken down and easily shipped in a pick-up truck to another location, the total tower plus equipment, including antenna and lines, not usually exceeding two to four hundred pounds, depending on the height of the tower and type of antenna.

Although the novel tower is shown supporting a high-frequency horizontally polarized broad-band, for example, four to thirty-two megacycle antenna, obviously it may be used for other purposes, such as a light tower or for radio relaying, etc.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A portable tower comprising multi-section upper and lower tower halves, each tower half comprising a plurality of telescoping sections of progressively larger transverse dimensions going from the bottom of the tower toward the middle height thereof and from the top of the tower also toward the middle height thereof, the sections of the tower halves being adapted to be telescoped into two compact packages for carrying from place to place.

2. A portable tower as defined in claim 1 wherein certain of said tower sections are provided with nesting brackets for receiving the end portion of an adjoining section, said nesting brackets and said section and portions having alignable apertures and quick release lockpins insertable through said aligned apertures for locking said sections together and into a rigid tower structure.

3. A portable tower as defined in claim 2 wherein said upper and lower tower halves at their point of juncture have cooperating hinge brackets at one side of the tower, and quick release locking hinge pins insertable into said hinge brackets while the tower halves are on the ground, whereupon the upper tower half used as a pike pole may be used to jack-knife the tower's lower half into upright position.

4. A portable tower as defined in claim 3 wherein an erecting boom is arranged to be attached to said lower tower half, an erection cable attachable to said erection boom, and winch means operable on the ground for pulling upon said cable to raise said upper tower half into vertical alignment with said lower tower half.

5. A tower of triangular cross-section having three vertical rails interconnected by cross-bracing, each two rails of a tower section face being provided with bracing that is affixed to the rails and which repeats structurally in successive bays or equal lineal portions of the tower, said bracing being affixed to one rail at the beginning of each bay height, to the other rail at one-third of the bay height, and then again to said one rail at two-thirds bay height beyond said one-third point, thereby providing a strong, light-weight structure.

6. A tower comprising a plurality of disconnectable sections of tripod shape having three rails spaced substantially one hundred and twenty degrees apart around the axis of the tower, and cross-bracing extending across the tower faces and interconnecting said rails at one-third and two-thirds bay height.

7. A portable tower comprising similar upper and lower tower halves consisting of a plurality of telescopic tripod sections, enabling the tower to be shipped in two compact nested tower section bundles, a base plate hingedly connected to the bottom of the lower tower half, a hinged connection between the upper and lower tower halves, an erection boom pivoted at said last-named hinged connection, and an auxiliary boom hinged upon said erection boom, the raising of said upper tower half enabling the same to be used as a pike pole to push the lower tower half up from the ground while turning about its pivoted connection on said base plate to a vertical position, the hinged connection between said upper and lower tower halves permitting such movement.

8. A portable tower as defined in claim 7 wherein an erection cable is connected to said main boom and is adapted to lie upon said auxiliary boom in elevating the upper tower half, and a winch for pulling upon said cable whereby, first said auxiliary boom acts as a lever to elevate the upper tower half and then said main boom acts as a lever for finishing the erection of said upper tower half.

References Cited by the Examiner

UNITED STATES PATENTS

| 2,804,950 | 9/1957 | Leslie | 52—646 X |
| 2,806,560 | 9/1957 | Cox | 52—637 |
| 2,828,841 | 4/1958 | Weeks | 52—694 X |
| 2,875,865 | 3/1959 | Rohn | 52—646 X |

FOREIGN PATENTS 1,003,928  3/1952  France.

RICHARD W. COOKE, JR., *Primary Examiner.*

FRANK L. ABBOTT, *Examiner.*

R. S. VERMUT, *Assistant Examiner.*